United States Patent
Nishikawa (10) Patent No.: US 7,481,291 B2
(45) Date of Patent: Jan. 27, 2009

(54) VEHICLE STEERABLE BY MOVEMENT OF CENTER OF GRAVITY

(75) Inventor: Gousuke Nishikawa, Kanagawa (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 410 days.

(21) Appl. No.: 10/558,739

(22) PCT Filed: Jun. 1, 2004

(86) PCT No.: PCT/JP2004/007908

§ 371 (c)(1),
(2), (4) Date: Dec. 1, 2005

(87) PCT Pub. No.: WO2004/108513

PCT Pub. Date: Dec. 16, 2004

(65) Prior Publication Data

US 2006/0260862 A1    Nov. 23, 2006

(30) Foreign Application Priority Data

Jun. 4, 2003    (JP)    ............................. 2003-159546

(51) Int. Cl.
*B62D 61/00*    (2006.01)
(52) U.S. Cl. .................... 180/218; 180/181; 180/89.14; 180/327
(58) Field of Classification Search ................. 180/218, 180/181, 89.14, 327
See application file for complete search history.

(56) References Cited

U.S. PATENT DOCUMENTS

| | | | | |
|---|---|---|---|---|
| 5,971,091 | A * | 10/1999 | Kamen et al. ................ | 180/218 |
| 6,225,977 | B1 * | 5/2001 | Li ............................... | 345/156 |
| 6,408,240 | B1 * | 6/2002 | Morrell et al. ................ | 701/82 |
| 6,435,535 | B1 | 8/2002 | Field et al. | |
| 6,543,564 | B1 | 4/2003 | Kamen et al. | |
| 2003/0183435 | A1 * | 10/2003 | Kamen et al. ............ | 180/89.14 |

FOREIGN PATENT DOCUMENTS

JP    6-92273    4/1994

(Continued)

*Primary Examiner*—Paul N Dickson
*Assistant Examiner*—Marlon A Arce Diaz
(74) *Attorney, Agent, or Firm*—Oblon, Spivak, McClelland, Maier & Neustadt, P.C.

(57) ABSTRACT

The present invention relates to a vehicle which can travel in the front and back direction and which can turn by right and left wheels rotated when a rider riding on a step-board moves the position of rider's balance from the center of a vehicle base.

A vehicle which can be steered based on movement of balance according to the present invention includes left and right wheels 4L and 4R located at least on the same axis, first and second drive motors 5L and 5R for rotating the left and right wheels 4L, 4R, a vehicle base 2 having the left and right wheels located at its left and right sides and which has the first and second drive motors mounted thereon, a step-board 3 located above the vehicle base 2 and on which a rider rides, pressure sensors 6L, 6R, 7L, 7R interposed between the vehicle base and the step-board to detect movement of rider's balance and a drive control means 10 for controlling driving of the first and second drive motors based on detected signals from the pressure sensors to enable the vehicle to travel straight and/or turn.

According to the present invention, it is possible for the rider to run the vehicle in the front and back direction and to turn the vehicle in the left and right direction by only moving rider's weight.

8 Claims, 8 Drawing Sheets

FOREIGN PATENT DOCUMENTS

| | | |
|---|---|---|
| JP | 9-10375 | 1/1997 |
| JP | 10-23613 | 1/1998 |
| JP | 2001-249060 | 9/2001 |
| WO | WO 86/02895 | 5/1986 |
| WO | WO 01/64502 A2 | 9/2001 |

* cited by examiner

VEHICLE STEERABLE BY MOVEMENT OF CENTER OF GRAVITY

TECHNICAL FIELD

The present invention relates to a vehicle which can be steered based on movement of balance in which a rider is able to run the vehicle in the forward and backward direction and to turn the vehicle by driving left and right wheels when the balance position of a rider riding on a step-board is moved from the center of a vehicle base after the rider's balance position has been detected.

BACKGROUND ART

In general, a skateboard is known as a vehicle by which a rider riding on a vehicle base or a step-board can skate on the skating surface of the land. This skateboard is composed of a board long in the front and back direction and which has suitable resiliency and front and back wheels rotatably supported on the lower surface of the front and back of this board. Each of the front and back wheels is formed of a combination of left and right wheels located symmetrically in the left and right direction. Accordingly, the board is supported on the skating surface of land by the four wheels on the whole.

Although the skateboarder is able to steer the skateboard having the above arrangement by moving skateboarder's weight, it is difficult for the skateboarder to continuously move the skateboarder's own weight and hence it is required that the skateboarder should become skillful to slalom. For this reason, as is disclosed in Cited Patent Reference 1, there is proposed a skating roller board by which the skateboarder becomes able to slalom easily.

Cited Patent Reference 1 has described the skating roller board for training by which skateboarders can skate or snowboarder can skate. The skating roller board described in the Cited Patent Reference 1 is characterized in that the front wheel is composed of one wheel.

Also, in the ordinary skateboard, the skateboarder is a power source for generating power and hence the skateboarder has to generate propulsive force to go ahead by kicking the ground with the foot. Accordingly, since almost all skateboarders suffer from hard labor to continuously generate propulsive force, there is provided a power-driven skateboard. An example of such power-driven skateboard is shown as Cited Patent Reference 2.

Cited Patent Reference 2 has described a power-driven skateboard with a safety device. In a skateboard including a propulsive force generating means and a controller for controlling the propulsive force generating means, this power-driven skateboard is comprised of a weighting detecting means for detecting whether or not vertical weighting is applied to the skateboard and a control means for allowing the propulsive force generating means to generate propulsive force when weighting is detected.

Cited Patent Reference 1:

Official Gazette of Japanese laid-open patent application No. 2003-126325 (page 2, FIG. 4)

Cited Patent Reference 2:

Official Gazette of Japanese laid-open patent application No. 2000-140190 (page 2, FIG. 1)

However, in the above-mentioned skateboard, the skateboarder is able to steer the skateboard by moving skateboarder's weight. When the skateboarder moves the skateboarder's weight, the shakeboard is bent to set an inclination angle between an axle of a front wheel and an axle of a back wheel, whereby the skateboarder can turn the skateboard in the inclination direction. Therefore, the skateboarder has to move the shakeboarder's weight after the skateboarder has determined the movement amount of the weight, the movement speed and the like in consideration of various factors such as a running speed and a radius of turning. Accordingly, it is difficult for the skateboarder to balance on the skateboard and hence it is requested that the skateboarder should become skillful to skate.

In view of the aforesaid aspects, the present invention intends to provide a vehicle which can be steered based on movement of weight, the rider being able to run this vehicle in the front and back direction and who is also able to turn this vehicle in the left and right direction by only moving the rider's weight.

DISCLOSURE OF THE INVENTION

In order to solve the above-described problems and in order to attain the above-described object, a vehicle which can be steered based on movement of balance according to claim 1 of the present application is composed of first and second wheels located at least on the same axis, a first rotary drive means for rotating the first wheel and a second rotary drive means for rotating the second wheel, a vehicle base having the first and second wheels located at its right and left sides and which has the first and second rotary drive means mounted thereon, a step-board located above the vehicle base and on which someone rides, a balance movement detecting means interposed between the vehicle base and the step-board to detect movement of rider's balance and a drive control means for controlling driving of the first and second rotary drive means based on a detected signal from the balance movement detecting means to enable the vehicle to travel straight and/or turn.

In a vehicle which can be steered based on movement of balance according to claim 2 of the present application, the balance movement detecting means is composed of a front-side detecting means located ahead of the position at which a rider rides on the vehicle base and a back-side detecting means located behind the position at which the rider rides on the vehicle.

In a vehicle which can be steered based on movement of balance according to claim 3 of the present application, the balance movement detecting means is composed of two front-side detecting means located at right and left sides ahead of the position at which a rider rides on the vehicle base and two back-side detecting means located at right and left sides behind the position at which the rider rides on the vehicle base.

In a vehicle which can be steered based on movement of balance according to claim 4 of the present application, the front-side detecting means and the back-side detecting means are both pressure sensors.

In a vehicle which can be steered based on movement of balance according to claim 5 of the present application, a third wheel is provided in addition to the first and second wheels and the third wheel is located with a displacement ahead of or behind an axial line connecting the first and second wheels.

In a vehicle which can be steered based on movement of balance according to claim 6 of the present application, third and fourth wheels located on the same axis are provided in addition to the first and second wheels and the third and fourth wheels are located with a displacement ahead of or behind the axial line connecting the first and second wheels.

In a vehicle which can be steered based on movement of balance according to claim 7 of the present application, the vehicle base includes a support shaft to rotatably support the step-board at one place in substantially a point-contact fashion.

In a vehicle which can be steered based on movement of balance according to claim 8 of the present application, the support shaft is provided on the vehicle base so as to rise at the position of balance of the vehicle base.

According to the aforementioned arrangement, in the vehicle which can be steered based on movement of balance according to the claim 1 of the present application, when the rider riding on the step-board moves rider's weight, movement of rider's weight is detected by the balance movement detecting means interposed between the vehicle base and the step-board and a detected signal is transmitted to the drive control means. Having received the detected signal, the drive control means supplies a control signal corresponding to the detected signal to the first and second rotary drive means to rotate the first and second wheels in response to the position of rider's weight. Consequently, the vehicle can travel straight and/or turn in response to the movement of rider's weight, and hence it is possible to provide an interesting vehicle which can be moved and steered by only moving rider's balance.

In a vehicle which can be steered based on movement of balance according to the claim 2 of the present application, since the front-side detecting means is located ahead of the vehicle base, the back-side detecting means is located behind the vehicle base and the step-board is supported by the front and back two detecting means, it is possible to accurately and reliably detect by the front and back two detecting means the direction and degree in which the position of rider's balance is moved when the rider on the step-board moves one's weight.

In a vehicle which can be steered based on movement of balance according to the claim 3 of the present application, since the right and left two front-side detecting means are located ahead of the vehicle base, the right and left two back-side detecting means are located behind the vehicle base and the step-board is supported by the four detecting means in total, it is possible to accurately and reliably detect by the front and back four detecting means the direction and degree in which the position of rider's balance is moved when the rider on the step-board moves rider's weight.

In a vehicle which can be steered based on movement of balance according to the claim 4 of the present application, since the pressure sensors are used as the detecting means, it is possible to easily and accurately detect movement of rider's balance by a simple mechanism.

In a vehicle which can be steered based on movement of balance according to the claim 5 of the present application, since the vehicle includes the third wheel in addition to the first and second wheels and the axle of the third wheel is located ahead of or behind the axle which connects the first and second wheels, it is possible to realize the vehicle of the present invention as a tricycle to improve stability of the vehicle.

In a vehicle which can be steered based on movement of balance according to the claim 6 of the present application, since the vehicle includes the third and fourth wheels located on the same axis in addition to the first and second wheels and the axle which connects the third and fourth wheels is located ahead of or behind the axle which connects the first and second wheels, it is possible to realize the vehicle of the present invention as a four-wheeled vehicle to improve stability of the vehicle.

In a vehicle which can be steered based on movement of balance according to the claim 7 of the present application, since the step-board is supported to the vehicle base at one portion by the supporting shaft, it is possible to simplify processing executed by the drive control means which executes calculation based on the detected signal outputted from the balance movement detecting means.

Also, in a vehicle which can be steered based on movement of balance according to the claim 8 of the present application, since the support shaft is provided at the position of balance of the vehicle base, it is possible to simplify processing executed by the drive control means more.

BEST MODE FOR CARRYING OUT THE INVENTION

Embodiments of the present invention will be described below with reference to the attached drawings.

Figure 1:
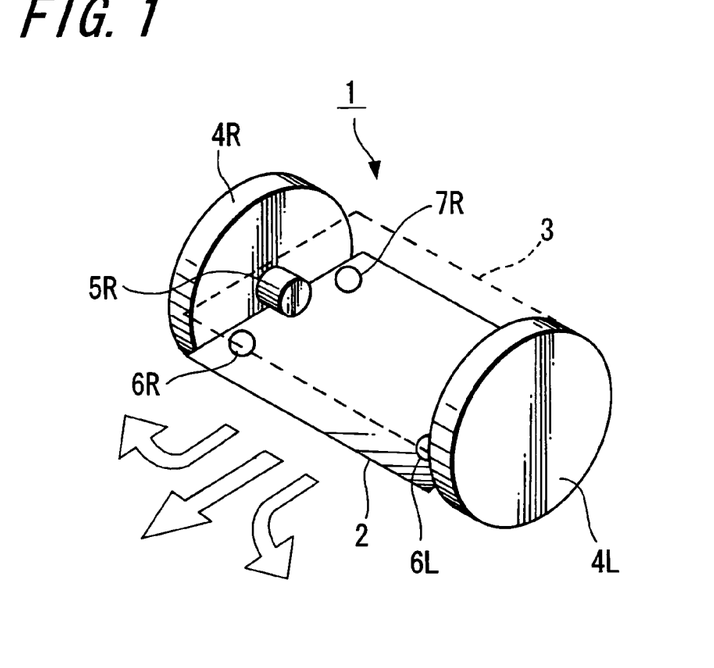
FIG. 1 is a perspective view schematically showing an arrangement of a bicycle according to a first embodiment of a vehicle which can be steered based on balance movement according to the present invention.
Figure 2:
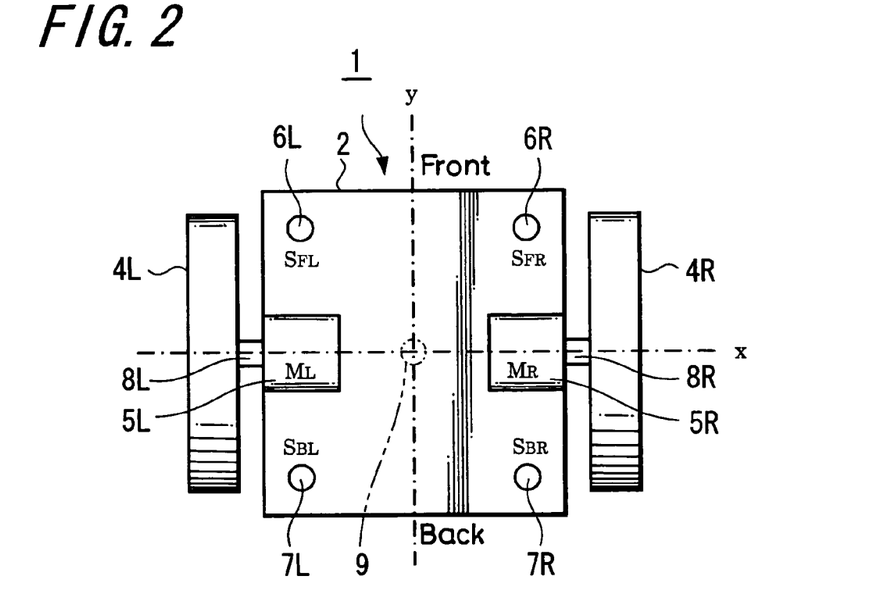
FIG. 2 is a plan view of the bicycle shown in FIG. 1.
Figure 3:
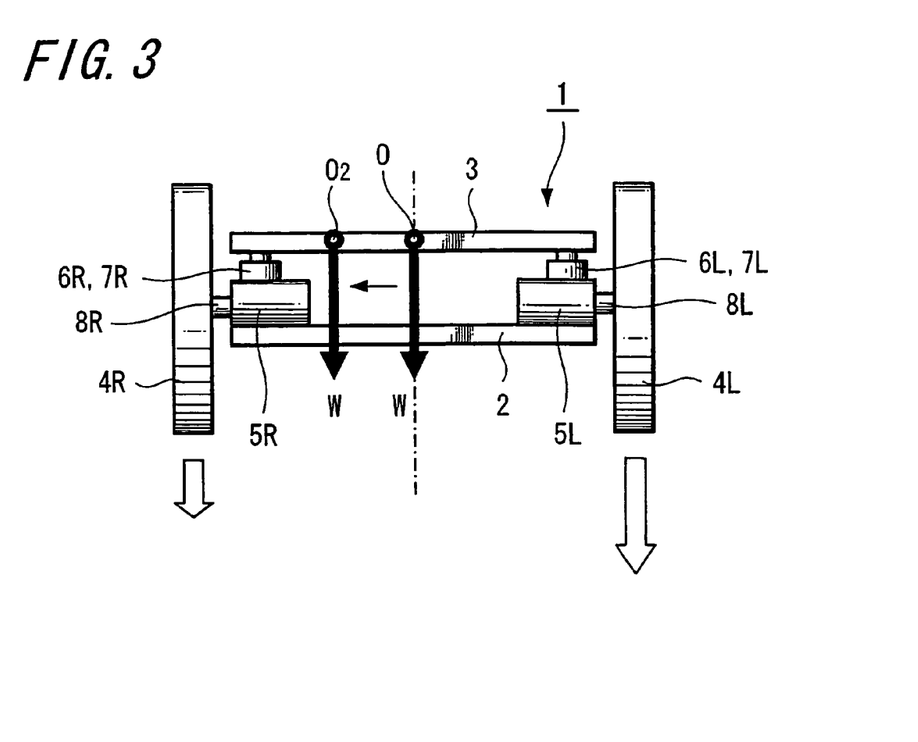
FIG. 3 is a front view of the bicycle shown in FIG. 1.

As shown in FIGS. 1 to 3, a bicycle 1 of a vehicle which can be steered based on balance movement according to a first embodiment of the present invention is composed of a vehicle base 2, a step-board 3, two wheels 4L, 4R, two drive motors 5L, 5R, four pressure sensors $S_{FL}$, $S_{FR}$, $S_{BL}$ and $S_{BR}$ and so forth.

The vehicle base 2 is formed of a square board-like member and it has a left-hand side drive motor 5L, which shows a specific example of a first rotary drive means, mounted on the left-hand side of its intermediate portion of the front and back direction. Also, it has a right-hand side drive motor 5R, which shows a specific example of a second rotary drive means, mounted on the right-hand side of its intermediate portion of the front and back direction. A DC motor, a synchronous motor, an induction motor and a stepper motor, for example, may be suitable for the application to these drive motors 5L, 5R but motors of other types also can be applied to these drive motors.

The respective drive motors 5L, 5R are fixed to the vehicle base 2 by a fixing means such as screws such that their rotary shafts 8 are projected in the lateral directions. A left-hand side wheel 4L is fixed to a rotary shaft 8L of the left-hand side drive motor 5L and a right-hand side wheel 4R is fixed to a rotary shaft 8R of the right-hand side drive motor 5R. Thus, when the left and right drive motors 5L, 5R are rotated in the directions opposite to each other, the left and right wheels 4L, 4R are rotated in the front direction or in the back direction at the same time in response to their rotation directions. On the other hand, when the left and right drive motors 5L, 5R are rotated in the same direction, the left and right wheels are rotated in the directions opposite to each other in response to their rotation directions.

Four pressure sensors, in total, which show a specific example of a balance movement detecting means, are mounted on the four corners of the vehicle base 2. Specifically, a front left-hand side sensor ($S_{FL}$) 6L is disposed at the front left corner of the vehicle base 2 and a front right-hand side sensor ($S_{FR}$) 6R is disposed at the front right corner of the vehicle base. Then, a back left-hand side sensor ($S_{BL}$) 7L is disposed at the back left corner of the vehicle base 2 and a back right-hand side sensor ($S_{BR}$) 7R is disposed at the back right corner of the vehicle base. The same pressure sensors are used as the four pressure sensors 6L, 6R, 7L, 7R and they are fixed to the vehicle base 2 in such a manner that their input portions are faced upward.

Figure 4:
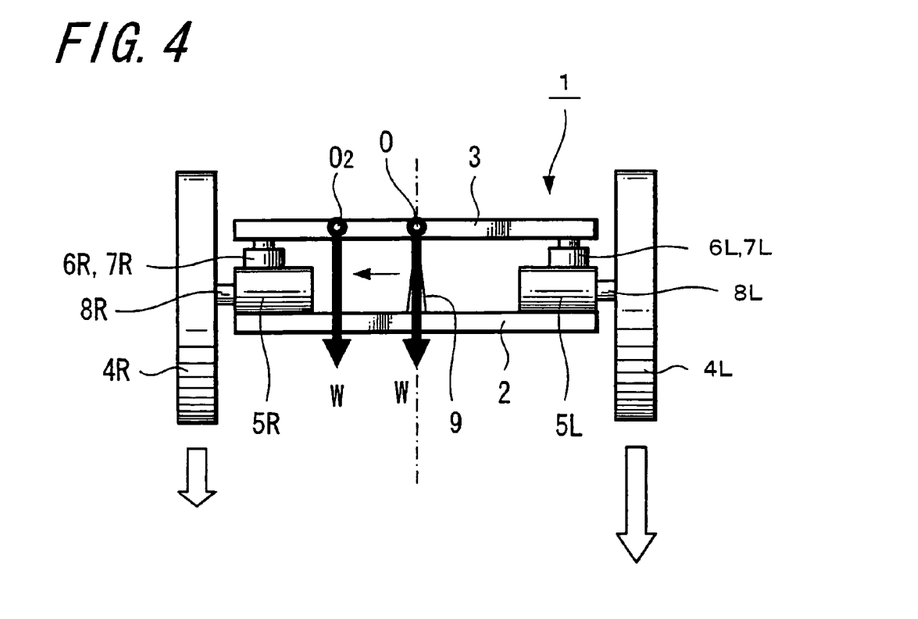
FIG. 4 is a front view of a modified embodiment of the bicycle shown in FIG. 1.

A step-board 3 formed of a square board member, which has substantially similar planar shape as that of the vehicle base 2, is mounted on the four pressure sensors 6L, 6R, 7L, 7R. As shown in FIG. 3, this step-board 3 may be only mounted on the four pressure sensors 6L, 6R, 7L, 7R without setting the reference position along the height direction. However, as shown in FIG. 4, it is desirable that the step-board 3 should rotatably be supported at one place by a support shaft 9 erected on the vehicle base 2 in substantially a point-contact fashion.

In this case, when the step-board 3 is supported, the support shaft 9, for example, has a spherical surface portion formed at its tip end and a spherical surface bearing which can rotatably hold the above spherical surface portion is formed on the lower surface of the step-board 3, whereby the step-board can be supported by a combination of the spherical surface portion and the spherical surface bearing. This spherical surface portion and the spherical surface bearing may be disposed in the manner opposite to the above manner so that the spherical surface bearing may be formed on the tip end of the support shaft 9 and that the spherical surface portion may be formed on the step-board 3.

As described above, the step-board 3 is supported by the support shaft 9 from the lower direction and the four pressure sensors 6L, 6R, 7L, 7R are disposed with the equal distance from the support shaft 9, whereby values (reference values) of all pressure sensors 6L, 6R, 7L, 7R can be set to be equal when the step-board 3 is placed in the horizontal state. In such a case, detected values among the four pressure sensors 6L, 6R, 7L, 7R need not be adjusted each other and their detected values are supplied to a drive control means, which will be described later on, as they are. Accordingly, it is possible to simplify calculation processing of inclination direction, inclination angle and the like by using their detected values.

On the other hand, in the case of the embodiment shown in FIG. 3 in which the support shaft 9 is not provided, since the reference position of the step-board 3 is not set, the height of the step-board 3 in the horizontal state is changed with the rider's weight. Consequently, as the rider's balance is moved, the inclination of the step-board 3 is changed while the whole of the step-board is being moved in the upper and lower direction. Accordingly, the reference position of the step-board 3 is changed every time and it is necessary to calculate the reference position of the step-board 3 each time. Then, since it becomes possible to calculate the displacement amounts among the pressure sensors 6L, 6R, 7L, 7R by comparing the thus calculated reference positions with respective detected values and also it becomes possible to calculate the inclination direction, the inclination angle and so on of the step-board 3 by using the calculated values, the calculation processing becomes a little cumbersome.

In order to execute such calculation processing, the detected signals are supplied from the four pressure sensors 6L, 6R, 7L, 7R to the vehicle base 2 and this vehicle is provided with a drive control means 10 which outputs control signals to control driving of the two drive motors 5L, 5R based on these detected signals. This drive control means 10 may have an arrangement shown in FIG. 6, for example.

Figure 6:
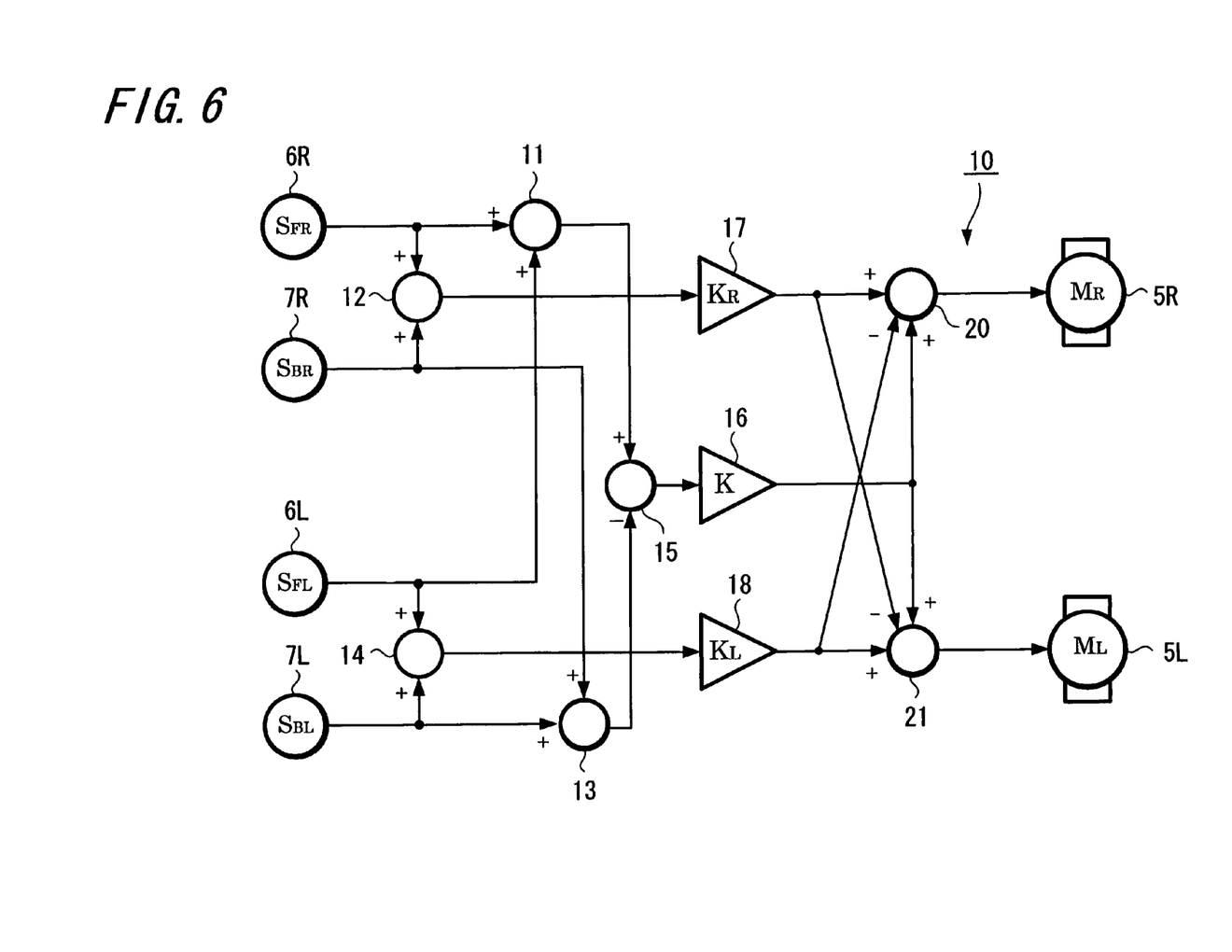
FIG. 6 is a circuit diagram showing an arrangement of a drive control means according to a first embodiment of the present invention.

The drive control means 10 is composed of four adders 11, 12, 13, 14, a summing subtracter 15, three amplifiers 16, 17, 18 and two summing accumulators 20, 21. A detected signal from the front right sensor ($S_{FR}$) 6R is inputted to the first and second adders 11 and 12. A detected signal from the back right sensor ($S_{BR}$) 7R is inputted to the second and third adders 12 and 13. Also, a detected signal from the front left sensor ($S_{FL}$) 6L is inputted to the first and fourth adders 11 and 14 and a detected signal from the back left sensor ($S_{BL}$) 7L is inputted to the third and fourth adders 13 and 14.

A signal outputted from the first adder 11 is inputted to the summing subtracter 15 and a signal outputted from the third adder 13 also is inputted to the summing subtracter 15. A signal outputted from the summing subtracter 15 is inputted to the first amplifier 16. Also, a signal outputted from the second adder 12 is inputted to the second amplifier 17 and a signal outputted from the fourth adder 14 is inputted to the third amplifier 18. Then, signals outputted from the first amplifier 16, the second amplifier 17 and the third amplifier 18 are respectively inputted to the first and second summing accumulators 20 and 21.

The first summing accumulator 20 is connected to the right-hand side drive motor 5R for rotating the right-hand side wheel 4R and the second summing accumulator 21 is connected to the left-hand side drive motor 5L for rotating the left-hand side wheel 4L. As a result, the first summing accumulator 20 outputs a control signal to control driving of the right-hand side drive motor 5R and the second summing accumulator 21 outputs a control signal to control driving of the left-hand side drive motor 5L. Driving forces for driving the respective drive motors in response to the thus outputted control signals are calculated by the following equations, for example.

Let it be now assumed that pressures of the four pressure sensors 6L, 6R, 7L, 7R are $S_{FL}$, $S_{FR}$, $S_{BL}$, $S_{BR}$ and that coefficients of the three amplifiers 16, 17, 18 are K, $K_L$, $K_R$. Then, driving force $M_R$ of the right-hand side drive motor 5R is expressed by the following equation:

$$M_R = K_R(S_{FR}+S_{BR}) - K_L(S_{FL}+S_{BL}) + K(S_{FR}+S_{FL}-S_{BR}+S_{BL}) \quad (1)$$

Driving force $M_L$ of the left-hand side drive motor 5L is given by the following equation:

$$M_L = K_L(S_{FL}+S_{BL}) - K_R(S_{FR}+S_{BR}) + K(S_{FR}+S_{FL}-S_{BR}+S_{BL}) \quad (2)$$

Figure 5:
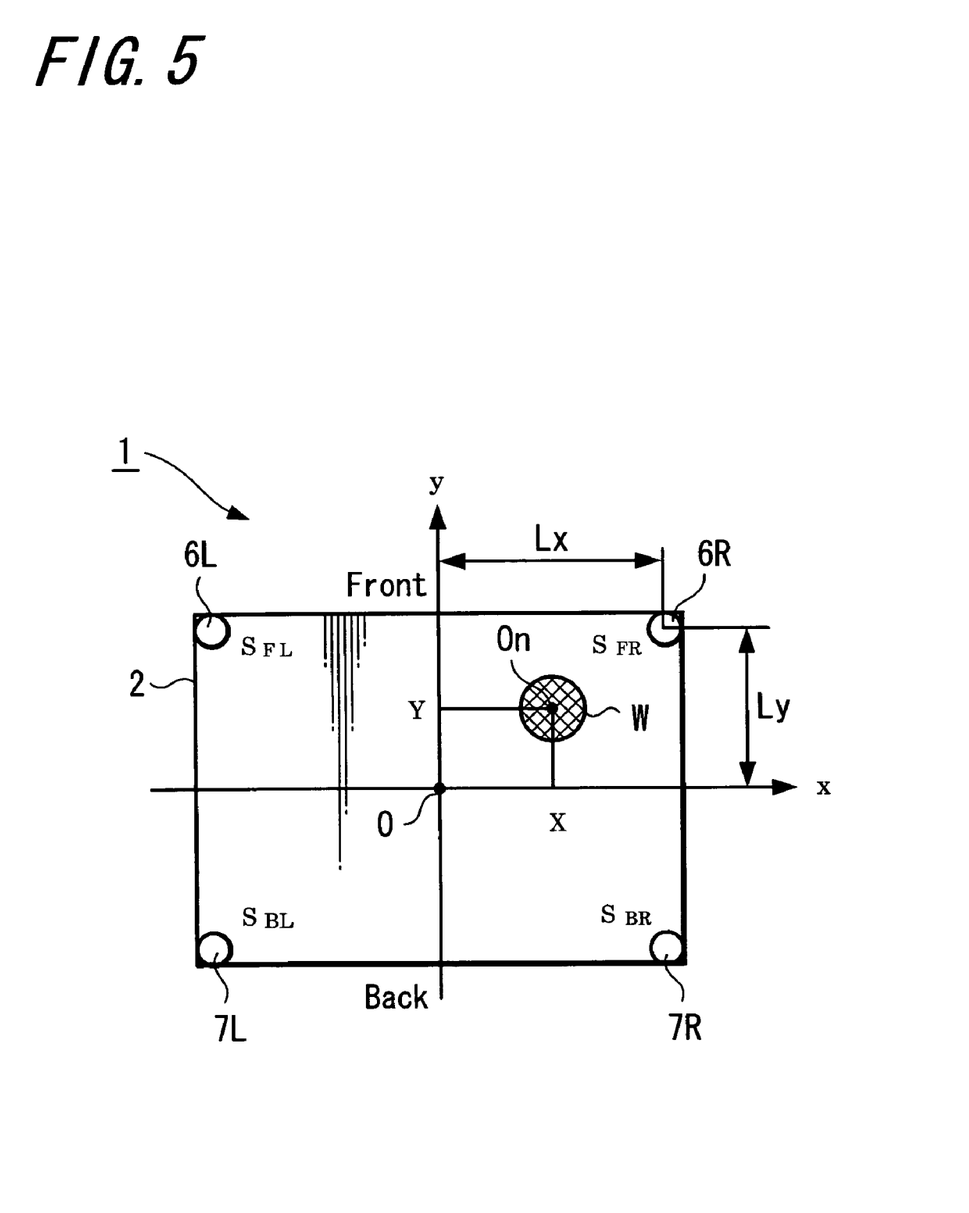
FIG. 5 is an explanatory diagram useful for explaining a pressure distribution of pressure sensors which show a balance movement detecting means according to a first embodiment of the present invention.

Also, as shown in FIG. 5, let it be assumed that a total weight applied to the four pressure sensors 6L, 6R, 7L, 7R is W, weight components shared by the respective pressure sensors 6L, 6R, 7L, 7R are W1, W2, W3, W4, a center of balance of the vehicle base 2 is O and that distances from the x axis and the y axis of orthogonal coordinate axes set around the balance 0 to the weight W are X and Y. Further, let it be assumed that the distances from the x axis and the y axis to the respective pressure sensors 6L, 6R, 7L, 7R are equally Lx and Ly.

Then, the total weight W obtained at that time is expressed by the following equation:

$$\text{Total weight } W = S_{FL}+S_{FR}+S_{BL}+S_{BR} \quad (3)$$

Also, weight components W1, W2, W3, W4 are respectively expressed by the following equations:

$$\text{Weight component } W1 = (S_{FL}+S_{FR})/2 \quad (4)$$

$$\text{Weight component } W2 = (S_{BL}+S_{BR})/2 \quad (5)$$

$$\text{Weight component } W3 = (S_{FL}+S_{BL})/2 \quad (6)$$

$$\text{Weight component } W4 = (S_{BR}+S_{FR})/2 \quad (7)$$

Further, coordinate positions X, Y of the balance O are expressed by the following equations:

$$X = Lx \times (W1-W2)/(W1+W2) \quad (8)$$

$$Y = Ly \times (W3-W4)/(W3+W4) \quad (9)$$

Figure 7A:
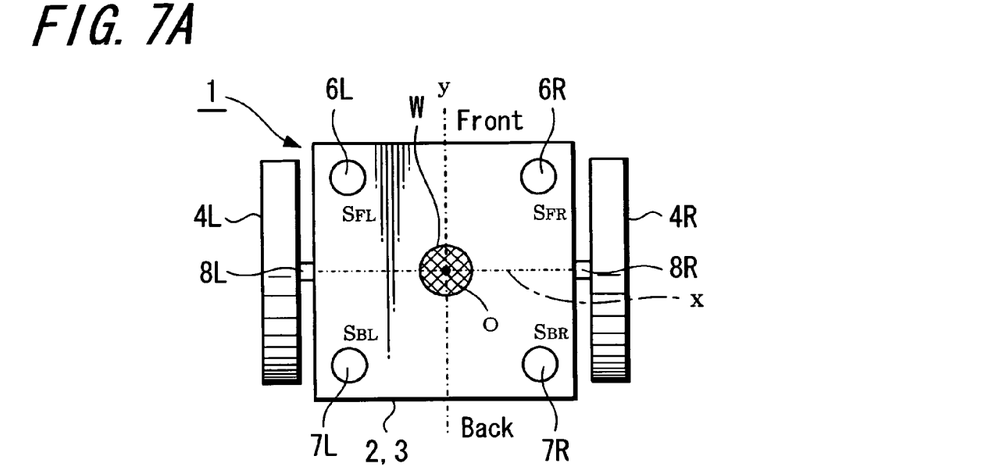
FIG. 7A is an explanatory diagram used to explain balance movement detected by the balance movement detecting means according to the present invention and to which reference will be made in explaining the state in which balance W and a vehicle center O become coincident with each other.

Because the rider stands on the central portion of the step-board 3, the balance W is coincident with the center O of the vehicle base 2 (shown by solid arrows in FIGS. 3 and 4) with the result that the vehicle base 2 and the step-board 3 are both placed horizontally in the equilibrium state as shown in FIG. 7A.

Figure 7B:
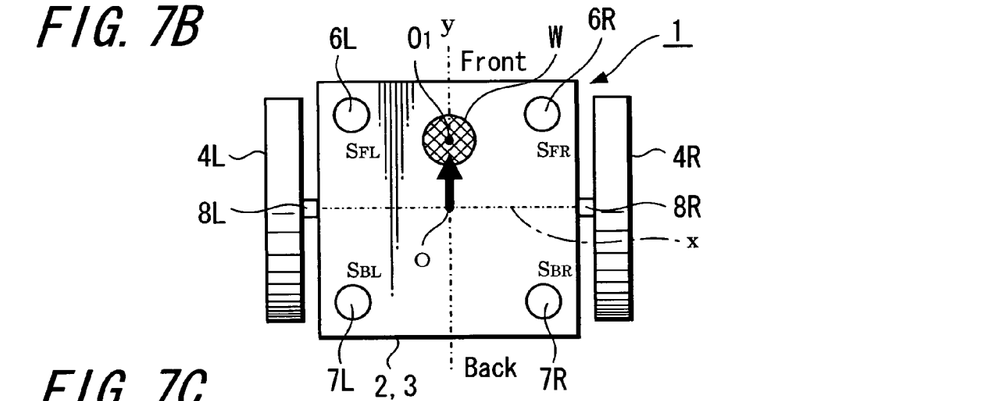
FIG. 7B is a diagram used to explain balance movement detected by the balance movement detecting means according to the present invention and to which reference will be made in explaining the state in which the balance W is moved from the vehicle center O to the front side.

Let it now be assumed that the rider moves the weight in this balanced state so that the above state is changed to the state shown in FIG. 7B. At that time, since the balance W exists on the y axis, although the values of the pressure sensors 6L and 6R and the pressure sensors 7L and 7R located on the left and right direction are equal to each other ($S_{FL}=S_{FR}$), ($S_{BL}=S_{BR}$), the values of the pressure sensors 6L and 7L and the pressure sensors 6R and 7R located in the front and back direction become positive and negative ($S_{FL}=-S_{BL}$), ($S_{FR}=-S_{BR}$), respectively.

For example, assuming that the values of $S_{FL}=S_{FR}$ are equal to each other and that they are 10 kg, then $S_{BL}+S_{BR}=-10$ kg is established.

Also, if the values of K, $K_L$, $K_R$ are respectively selected to be 1 in order to simplify computation, the following equation is obtained from the equation (1):

$$M_R = 1(10-10) - 1(10-10) + 1(10+10+10-10) = 20$$

Similarly, the following equation is obtained from the equation (2):

$$M_L = 1(10-10) - 1(10-10) + 1(10+10+10-10) = 20$$

As described above, driving forces for rotating the left and right wheels 4L, 4R become the same values with the same sign and become 20 kg. As a result, the left and right wheels 4L and 4R are both rotated in the front direction by the equal driving force. As a consequence, this vehicle travels straight in the upper direction along the y axis direction in FIG. 7B.

Figure 7C:
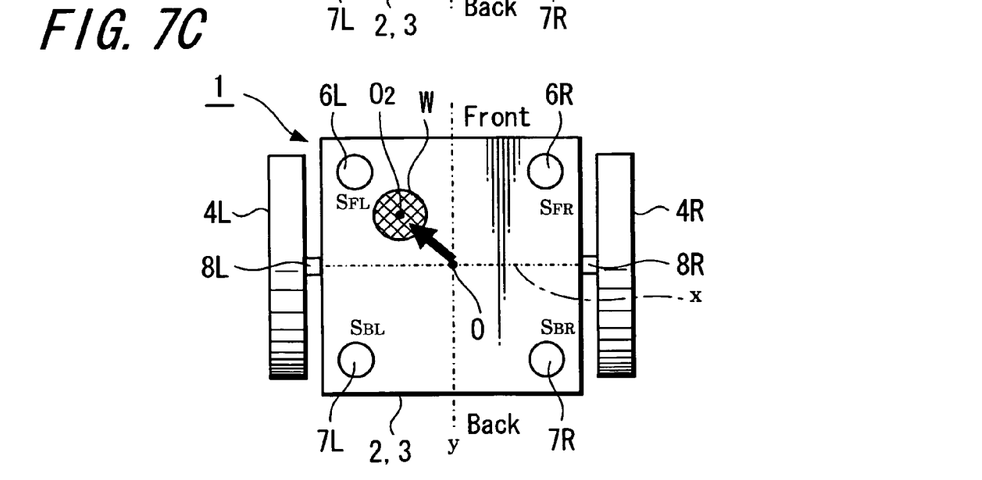
FIG. 7C is a diagram used to explain balance movement detected by the balance movement detecting means according to the present invention and to which reference will be made in explaining the state in which the balance W is moved from the vehicle center O to the front left side.

On the other hand, let it be assumed that the well-balanced state shown in FIG. 7A is changed to the state shown in FIG. 7C by movement of the balance W. At that time, for example, let it be assumed that the value of $S_{FL}$ is 10 kg, the values of $S_{FR}$ and $S_{BL}$ are both 5 kg and that the value of $S_{BR}$ is $-10$ kg. Then, $M_R$ obtained at that time is expressed by the equation (1) as:

$$M_R = 1(5-10) - 1(10+5) + 1(5+10+10+5) = -5-15+30 = 10$$

Also, $M_L$ is given by the equation (2) as:

$$M_L = 1(10+5) - 1(5-10) + 1(5+10+10+5) = 15+5+30 = 50$$

In this case, the driving force for rotating the left wheel 4L becomes 50 kg and the driving force for rotating the right wheel 4R becomes 10 kg. Accordingly, control signals corresponding to these driving forces are outputted from the drive control means 10 to the left-hand side drive motor 5L and the right-hand side drive motor 5R. Thus, in response to the values of the inputted control signals, the left wheel 4L is rotated by the driving force of 50 kg and the right wheel 4R is rotated by the driving force of 10 kg. As a result, this vehicle turns in the clockwise direction in FIG. 7C.

Therefore, according to this embodiment, as shown in FIG. 7A, when the balance W is moved in the front side from the vehicle center O by movement of rider's weight, the weight balance of the vehicle is moved toward the front side and movement of the balance W is detected by the four pressure sensors 6L, 6R, 7L, 7R. As a result, the detected signals corresponding to the detected values are outputted from the respective pressure sensors 6L, 6R, 7L, 7R and these detected signals are inputted to the drive control means 10, whereby the drive control means 10 outputs the control signals corresponding to the movement amount of the balance W to the left and right drive motors 5L, 5R.

Thus, the left and right wheels 4L, 4R are similarly rotated in the front side. As a result, the vehicle travels in the front side and the vehicle can continuously travel straight in the forward direction by maintaining the state in which the balance W is moved from the vehicle center O to the front side.

When this vehicle is stopped from traveling in the forward direction, the balance W that has been placed at the displaced position should be returned to the vehicle center O. At that time, when the balance W is returned to the vehicle center O, the detected values outputted from the four pressure sensors 6L, 6R, 7L, 7R become equal to each other so that the control signals outputted to the left and right drive motors 5L, 5R are both decreased to zero. As a result, rotations of the left and right drive motors 5L, 5R are stopped and the vehicle is stopped running.

Controlling of traveling of the vehicle will apply for the case in which the balance W is moved from the vehicle center O to the rearward as well. Specifically, when it is detected by the four pressure sensors 6L, 6R, 7L, 7R that the balance W is moved from the vehicle center O to the rearward, the drive control means 10 outputs the control signals to enable the left and right wheels 4L, 4R to be rotated in the backward direction. Thus, the vehicle can travel in the backward direction. Also, the vehicle can be stopped from being moved in the backward direction by a method similar to the aforementioned method required when the vehicle is stopped from being moved in the forward direction.

Also, when the balance W is moved from the vehicle center O to the front direction or the oblique backward direction or the lateral direction by movement of rider's weight, the weight balance of the vehicle is changed in the moving direction of the balance W and the changes of balance are detected as the changes of pressure by the four pressure sensors 6L, 6R, 7L, 7R and the detected signals are supplied to the drive control means 10. Consequently, the drive control means 10 outputs the control signals corresponding to the movement amount of the balance W to the left and right drive motors 5L, 5R.

Accordingly, the left and right wheels 4L, 4R are rotated in the forward direction or the backward direction in response to the respective control signals. As a result, the wheel of the direction in which the balance W is moved is rotated more strong that the other wheel and the driving force corresponding to the weight component is generated, whereby the vehicle can turn in the right direction or the left direction.

Figure 8:
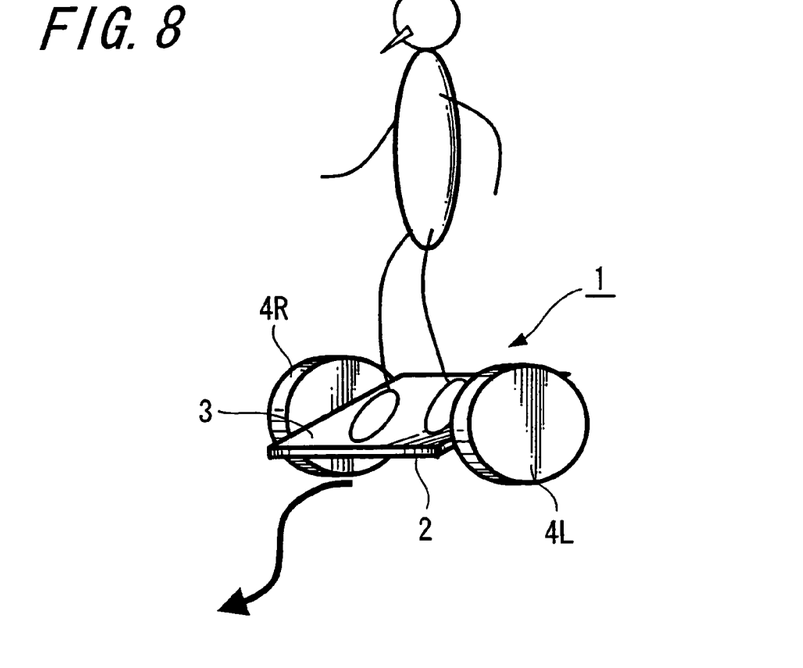
FIG. 8 is an explanatory diagram showing the state in which someone rides on the bicycle according to the first embodiment of the present invention.
Figure 9:
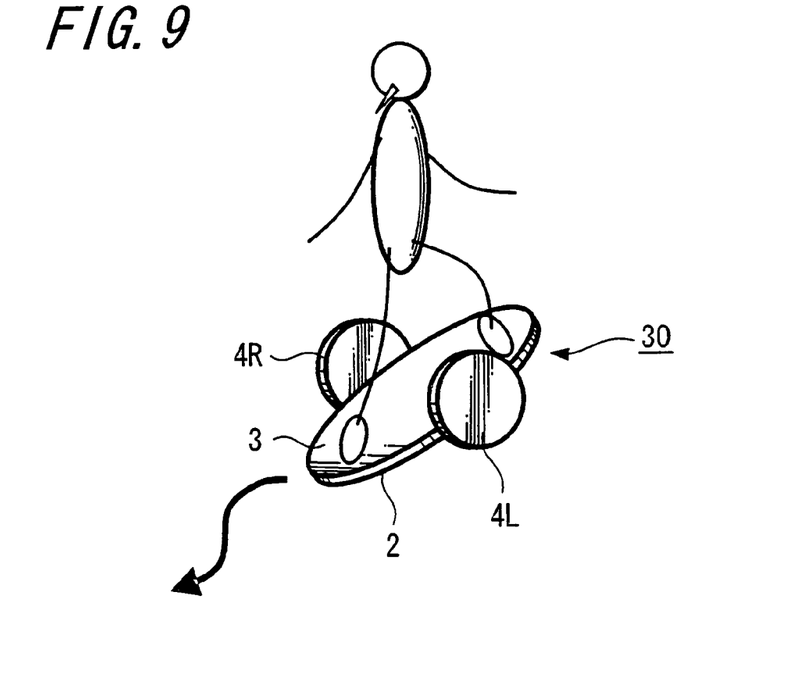
FIG. 9 is an explanatory diagram showing the bicycle according to the second embodiment of the present invention.
Figure 10:
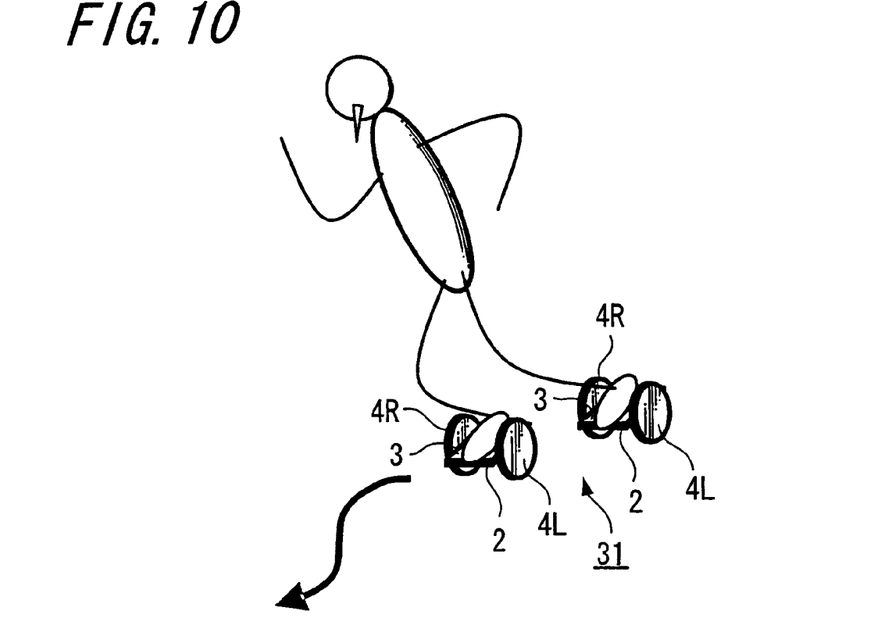
FIG. 10 is an explanatory diagram showing a bicycle according to a third embodiment of the present invention.
Figure 11:
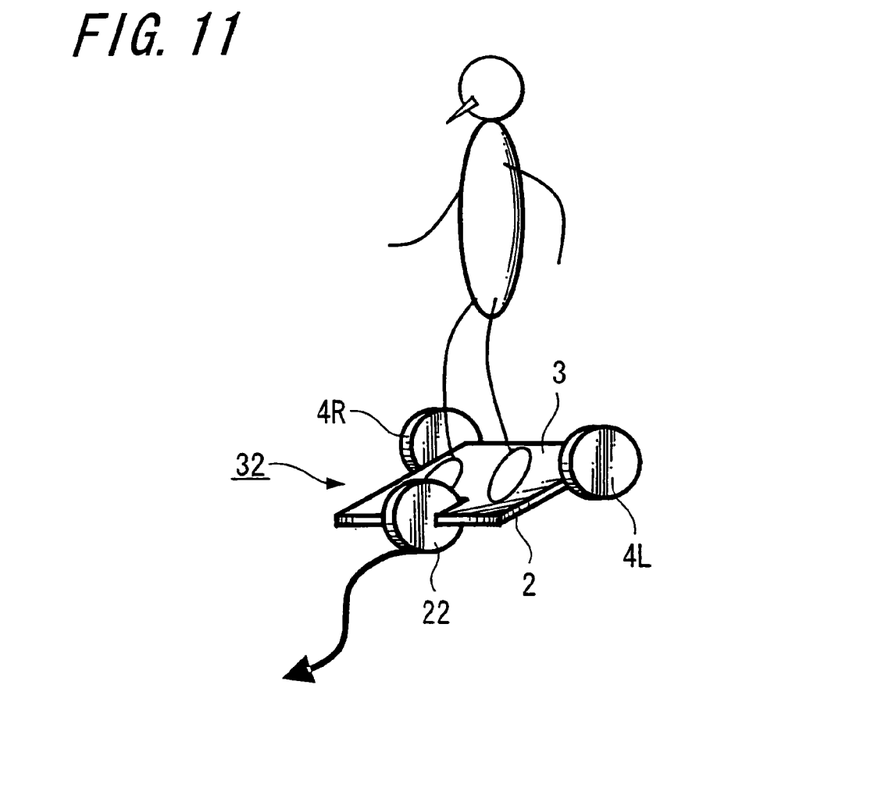
FIG. 11 is an explanatory diagram showing a tricycle according to a first embodiment of the present invention.
Figure 12:
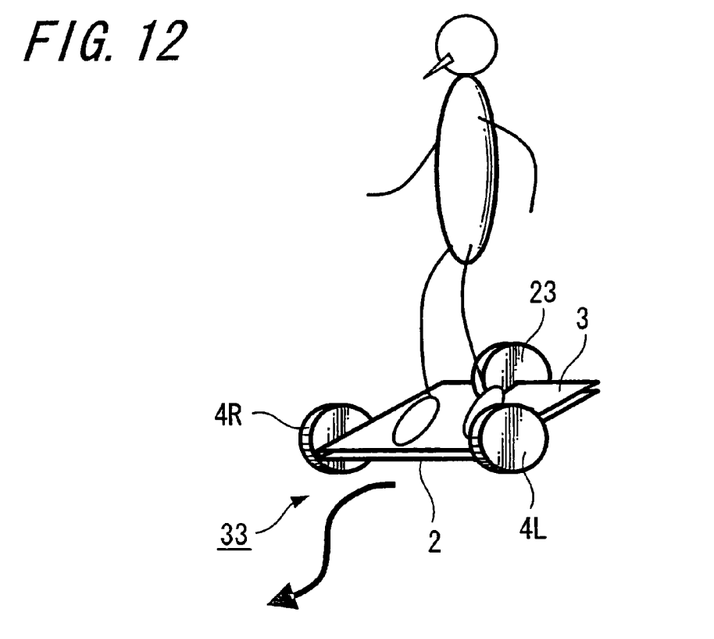
FIG. 12 is an explanatory diagram showing a tricycle according to a second embodiment of the present invention.
Figure 13:
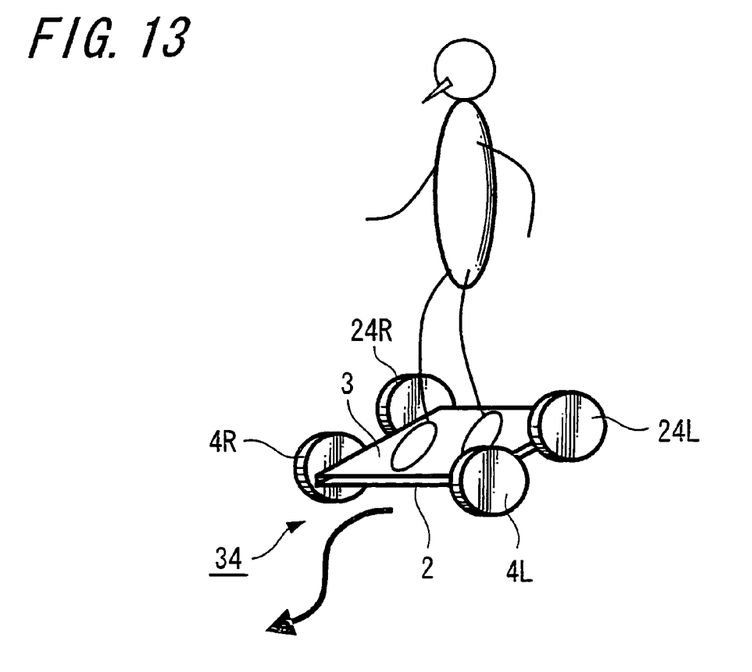
FIG. 13 is an explanatory diagram showing a four-wheeled vehicle according to a first embodiment of the present invention.

The vehicle which can be moved and steered as described above may be realized as vehicles having arrangements shown in FIGS. 8 to 13, for example. FIGS. 8 to 10 show the vehicles constructed as bicycle type vehicles; FIGS. 11 and 12 show the vehicles constructed as tricycle type vehicles and FIG. 13 shows the vehicle constructed as a four-wheeled type vehicle. In FIGS. 8 to 13, elements and parts identical to those of FIGS. 1 to 4 are denoted by identical reference numerals and therefore need not be described.

A first embodiment of the bicycle type vehicle shown in FIG. 8 shows the vehicle by which the rider can ride on the vehicle with legs wide open in the lateral direction as if the rider was riding on the log. In the case of this bicycle 1, the rider can ride on this bicycle relatively easily with high stability as if the rider was riding on the log, and hence the rider is able to run and steer this bicycle by only moving the balance.

A second embodiment of the bicycle type vehicle shown in FIG. 9 shows the vehicle by which the rider can ride on this bicycle with legs wide open in the front and back direction as if the rider was riding on the surfboard. In the case of this bicycle 30, the rider can ride on this bicycle as if the rider was surfing. In addition, the rider can ride on this bicycle with high stability and the rider is able to run and steer the bicycle by only moving the balance.

A third embodiment of the bicycle type vehicle shown in FIG. 10 shows the vehicle in which the rider can ride on this bicycle with left and right legs attached to bicycles as roller skates. In the case of this bicycle 31, the rider can ride on this bicycle as if the rider was roller skating. Thus, in a similar manner, the rider is able to run and steer this bicycle by only moving the balance.

A first embodiment (tricycle 32) of the tricycle type vehicle shown in FIG. 11 shows the tricycle in which one auxiliary wheel 22 is provided at the front central portion of the left and right wheels 4L, 4R. Also, a second embodiment (tricycle 33) of the tricycle type vehicle shown in FIG. 12 shows the tricycle in which one auxiliary wheel 23 is provided at the rear central portion of the left and right wheel 4L, 4R. Since the auxiliary wheel 22 of the tricycle 32 and the auxiliary wheel 23 of the tricycle 33 are mainly used to maintain stability of the vehicle base 2, although it is sufficient that they may be rotatably supported to the vehicle base 2 or the step-board 3, they may include power such a driving motor similarly to the left and right wheels 4L, 4R.

A first embodiment (four-wheeled vehicle 34) of a four-wheeled type vehicle shown in FIG. 13 shows a four-wheeled vehicle in which a pair of auxiliary wheels 24L, 24R is provided at the back side (front side is also possible) of the left and right wheels 4L, 4R. Since the auxiliary wheels 24L, 24R of the four-wheeled vehicle 34 are mainly used to maintain stability of the vehicle base 2, although it is sufficient that they may be rotatably supported to the vehicle base 2 or the step-board 3, they may have power such as driving motors similarly to the left and right wheels 4L, 4R. Also, although not shown, one auxiliary wheel may be disposed at the front and back central portions of the left and right wheels 4L, 4R, whereby four wheels may be located in a diamond fashion on the whole.

According to the vehicles 30, 31, 32, 33 and 34 having the arrangements shown in FIGS. 9 to 13, similarly to the vehicle 1 of the aforementioned first embodiment, the rider can run and steer the vehicles by moving the balance.

As the aforementioned wheels, there can be used wheels made of various kinds of materials such as tubular tires into which air is filled, solid rubber tires the whole of which are made of rubber, wooden wheels, metal wheels and plastic wheels. Also, while the examples in which the pressure sensors are used as the balance movement detecting means have been described so far, the pressure sensor may be replaced with a strain gauge in which a physical amount such as pressure, load, displacement and torque may be converted into an electric signal to thereby detect a weight.

Further, while the cases in which the vehicle includes the four pressure sensors $S_{FL}$, $S_{FR}$, $S_{BL}$ and $S_{BR}$ have been described so far in the above-described embodiments, the present invention is not limited thereto and one pressure sensor may be disposed ahead of or behind the balance position of the vehicle. In this case, the front and back pressure sensors may be located in the front and back diagonal lines or they may be located in the front and back direction along the central line.

For example, only the front left-hand side sensor ($S_{FL}$) 6L may be located at the left corner of the front side of the vehicle base 2 and only the back right-hand side sensor ($S_{BR}$) 7R may be located at the right corner of the back side of the vehicle base 2. Conversely, only the front right-hand side sensor ($S_{FR}$) 6R may be located at the right corner of the front side of the vehicle base 2 and only the back left-hand side sensor ($S_{BL}$) 7L may be located at the left corner of the back side of the vehicle base 2. In the case of such arrangement, if the outputs of the front side pressure sensor ($S_{FR}$) or ($S_{FL}$) and the back side pressure sensor ($S_{BL}$) or ($S_{BR}$) that should be deleted are decreased to zero, explanations concerning the above-mentioned calculation equations will apply for operations other than turning operation and hence the rider can run the vehicle straight.

Further, if the vehicle has the arrangement in which it includes any one of the front left-hand side sensor ($S_{FL}$) 6L or the front right-hand side sensor ($S_{FR}$) 6R and the back right-hand side sensor ($S_{BR}$) 7R or the back left-hand side sensor ($S_{BL}$) 7L, then the rider can turn the vehicle. In this case, if the outputs of the front side pressure sensor ($S_{FR}$) or ($S_{FL}$) and the back side pressure sensor ($S_{BL}$) or ($S_{BR}$) that should be deleted are decreased to zero, then explanations concerning the above-mentioned calculation equations will apply for operations other than traveling straight as well and hence the rider can turn the vehicle. Furthermore, the vehicle may have a modified arrangement in which three pressure sensors are located in a triangular fashion.

Also, while the examples in which the pressure sensors are used as specific examples of the balance movement detecting means have been described so far in the above-described embodiments, sensors of other types, such as an elastomer sensor and an electrostatic capacity pressure transducer, can be applied to specific examples of the balance movement detecting means. The elastomer sensor is made of a material in which slight conductivity is given to rubber and soft synthetic resin and molded as a necessary shape. This elastomer sensor generates a resistance change proportional to a deformed amount and a resistance change proportional to its speed in addition to the function of the resistance change sensor. Further, this elastomer sensor has characteristics such that it can be made flexible and which can be processed by molding. By using this elastomer sensor, it is possible to obtain a signal which is coincident with the operation direction and also it is possible to obtain a signal proportional to a degree of rider's weight movement and fluctuations of a movement speed of rider's weight.

Also, the electrostatic capacity pressure transducer is adapted to measure pressure by using electric characteristics of electrostatic capacity (capacitance). When this electrostatic capacity pressure transducer is in use, a gap between the electrodes is decreased under a certain pressurized circumstance. Hence, it is possible to achieve effects similar to those of the above-described embodiments by measuring the change of resulting electrostatic capacity with a driving circuit. As described above, the present invention is not limited to the aforementioned embodiments shown in the sheets of drawings and can be variously modified and carried out without departing from the gist thereof.

The invention claimed is:

1. A vehicle which can be steered based on movement of balance comprising:
   first and second wheels located at least on the same axis;
   first rotary drive means for rotating said first wheel and second rotary drive means for rotating said second wheel;
   a vehicle base having said first and second wheels located at its right and left sides and which has said first and second rotary drive means mounted on a top surface of the base;
   a step-board located above said vehicle base and on which a rider rides;
   balance position detecting means interposed between said vehicle base and said step-board to detect a rider's balance position, wherein the vehicle can be steered based on the balance position, the balance position detecting means includes a front-side detecting means located ahead of the axis and back-side detecting means located behind the axis; and
   drive control means for controlling driving of said first and second rotary drive means to maintain the balanced state of said vehicle based on a detected signal from said balance position detecting means if the balance position is located at the center of balance of said vehicle base, and controlling driving of said first and second rotary drive means to enable said vehicle to travel straight and/or turn if the balance position is not located at the center of balance of said vehicle base.

2. In a vehicle which can be steered based on balance position according to claim 1, a vehicle which can be steered based on balance position wherein characterized in that said balance position detecting means is composed of two front-side detecting means located at right and left sides ahead of the position of rider riding on said vehicle base and two back-side detecting means located at right and left sides behind the position of rider riding on said vehicle base.

3. In a vehicle which can be steered based on balance position according to claim 1 a vehicle which can be steered based on balance position wherein said front-side detecting means and said back-side detecting means are both pressure sensors.

4. In a vehicle which can be steered based on balance position according to claim 1, a vehicle which can be steered based on balance position wherein a third wheel is provided in addition to said first and second wheels said third wheel being located with a displacement ahead of or behind an axial line connecting said first and second wheels.

5. In a vehicle which can be steered based on balance position according to claim 1, a vehicle which can be steered based on balance position wherein third and fourth wheels located on the same axis are provided in addition to said first and second wheels said third and fourth wheels being located with a displacement ahead of or behind an axial line connecting said first and second wheels.

6. In a vehicle which can be steered based on balance position according to claim 1, a vehicle which can be steered based on balance position wherein said wheel base is provided with a support shaft to rotatably support said step-board at one portion in substantially a point-contact fashion.

7. In a vehicle which can be steered based on balance position according to claim 6, a vehicle which can be steered based on balance position wherein said support shaft is provided on said vehicle base so as to rise at the balance position of said vehicle base.

8. In a vehicle which can be steered based on balance position according to claim 1, wherein the balance position detecting means includes two front-side detecting means located at right and left sides ahead of the position of rider riding on the vehicle base and two back-side detecting means located at right and left sides behind the position of rider riding on the vehicle base, and
   wherein the step-board is mounted on a top surface of each detecting means.

* * * * *